(12) United States Patent
Ohkawa et al.

(10) Patent No.: US 6,293,886 B1
(45) Date of Patent: Sep. 25, 2001

(54) HEAVY-DUTY POWER TRANSMISSION V-BELT

(75) Inventors: Hirokazu Ohkawa; Mitsuhiko Takahashi, both of Kobe (JP)

(73) Assignee: Bando Chemical Industries Ltd., Kobe (JP)

( * ) Notice: Subject to any disclaimer, the term of this patent is extended or adjusted under 35 U.S.C. 154(b) by 0 days.

(21) Appl. No.: 09/414,869

(22) Filed: Oct. 8, 1999

(30) Foreign Application Priority Data

Oct. 16, 1998 (JP) .................................................. 10-294878

(51) Int. Cl.[7] ...................................................... F16G 5/16
(52) U.S. Cl. ......................... 474/242; 474/245; 474/237
(58) Field of Search ................................... 474/201, 238, 474/240, 242, 245, 261, 272

(56) References Cited

U.S. PATENT DOCUMENTS 5,004,450 * 4/1991 Ide .......................................... 474/242

FOREIGN PATENT DOCUMENTS

| 0151396 | * | 8/1985 | (EP) . |
| 99120349.8 | * | 2/2000 | (EP) . |
| 01153839 | * | 9/1989 | (JP) . |
| 229038 | * | 10/1991 | (JP) . |
| 305475 | * | 10/1991 | (JP) . |
| 288440 | * | 10/1994 | (JP) . |

* cited by examiner

Primary Examiner—David A. Bucci
Assistant Examiner—Marcus Charles
(74) Attorney, Agent, or Firm—Nixon Peabody LLP; Thomas W. Cole

(57) ABSTRACT

A block-type heavy-duty power transmission V-belt including a large number of blocks fixedly engaged with tension members by fitting the tension members in fitting grooves formed on side faces of the blocks. In a reinforcing member embedded in each of the blocks, a beam angle between a vertical center line of an upper beam part disposed above the fitting groove and a pulley groove face closer to the center of a pulley than a portion of the pulley in contact with an upper contact part of the block is 90° or more. In this manner, to the base of the upper beam part is applied merely tensile stress derived from a shearing force working in a lengthwise direction of the belt between the block and the tension member, or tensile stress reduced correspondingly to compressive stress derived from downward bending moment applied to the upper beam part due to a reaction force from the pulley groove face. As a result, the stress applied to the base of the upper beam part can be reduced, so as to increase the transmission load of the belt without increasing the weight of each block.

4 Claims, 9 Drawing Sheets

HEAVY-DUTY POWER TRANSMISSION V-BELT

BACKGROUND OF THE INVENTION

The present invention relates to a heavy-duty power transmission V-belt.

A heavy-duty power transmission V-belt comprising a large number of blocks and a tension member including tension cords and hard rubber is conventionally well known and used in the field of stepless transmission. In this V-belt, power is transmitted between the tension member and the blocks through engagement between convex parts of the blocks and concave parts of the tension member. The respective blocks are fixed on the tension member not through adhesion but through physical engagement in order to secure flexibility of the V-belt.

In this conventional heavy-duty power transmission V-belt, each of the blocks is made form a hard resin material in which a reinforcing member for reinforcing the block is embedded in a manner that at least parts to be engaged with the tension member and parts to be in contact with a groove face of a pulley are made from the resin material. The reinforcing member includes upper and lower beam parts respectively located above and below the tension member and a pillar part for connecting the bases of the upper and lower beam parts.

In heavy-duty power transmission using this belt, however, when stress is repeatedly applied to the base of the upper beam part of the reinforcing member within the block located above the tension member (i.e., on the outer side in a radial direction of the pulley), the upper beam part can be broken at the base thereof. This makes impossible the power transmission by using the belt.

Therefore, as is disclosed in Japanese Laid-Open Utility Model Publication No. 5-3692, the upper beam part of the reinforcing member of the block is proposed to be bent into an arcuate shape so that the center portion thereof can be higher than right and left portions thereof extending in a widthwise direction of the belt. In the proposed reinforcing member, stress applied to the base of the upper beam part can be reduced by the bent of the upper beam part, thereby preventing the breakage thereof.

In the proposed reinforcing member, however, it is necessary to increase the size of the entire reinforcing member when further heavier-duty power transmission is desired. In this case, the block is increased in its weight, and hence, centrifugal tension is increased in drive of the belt around a pulley. Accordingly, there is a fear of early breakage of the tension member.

An object of the invention is reducing stress applied to the base of the upper beam part by appropriately modifying the shape of the reinforcing member embedded in each block, so as to further increase transmission load of the belt without largely increasing the weight of the block.

SUMMARY OF THE INVENTION

In order to achieve the aforementioned object, a beam angle between an upper beam part of a reinforcing member and a groove face of a pulley is set to be larger than a right angle in this invention, so as to suppress bending moment caused by a reaction force from the groove face pushing the tip of the upper beam part upward.

Specifically, the heavy-duty power transmission V-belt of this invention comprises two tension members each including a large number of upper engaged parts and lower engaged parts respectively correspondingly formed on upper and lower faces thereof and arranged in a lengthwise direction of the belt; and a large number of blocks each including a fitting groove on each side face thereof in a widthwise direction of the belt and upper and lower contact parts formed on upper and lower sides of the fitting groove to be brought into contact with a pulley groove face, and the fitting groove includes an upper engaging part formed on an upper face thereof to be engaged with each of the upper engaged parts of the tension members and a lower engaging part formed on a lower face thereof to be engaged with each of the lower engaged parts of the tension members. The blocks are fixedly engaged with the tension members by fitting the tension members in the fitting grooves of the blocks. Also, each of the blocks includes a reinforcing member embedded in a resin part in a manner that at least the upper and lower engaging parts and the contact parts are made from the resin part, and the reinforcing member includes upper and lower beam parts located above and below the fitting groove and a pillar part for connecting bases of the upper and lower beam parts.

Furthermore, a beam angle between a vertical center line of the upper beam part of the reinforcing member and a pulley groove face closer to a center of a pulley than a portion of the pulley in contact with the upper contact part on the side face of the block is 90° or more.

In this manner, the following effects can be attained: In a power transmission state between the belt and the pulley, a three-dimensional force is applied between each block and each tension member. This force is caused from a shearing force in the lengthwise direction working between the engaged part of the tension member and the engaging part of the block and also from a pushing force of the tension member for pushing the lower engaging part of the block toward the center of the pulley. On the other hand, in a state where the belt is not wound around the pulley, the above-described forces are not applied. Therefore, tensile stress is applied to the base of the upper beam part of each block due to repeated stress application between these two states. Furthermore, due to the shearing force, tensile stress is applied to one side portion of the reinforcing member in the lengthwise direction and compressive stress is applied to the other side portion of the reinforcing member. When the block is pushed against the groove face of the pulley by the pushing force from the tension member, the block receives a reaction force in a direction perpendicular to the groove face at the upper contact part disposed on the upper side of the tension member. In a conventional structure, a beam angle between a vertical center line of the upper beam part of the reinforcing member and the groove face of the pulley in a position closer to the center of the pulley than a portion thereof in contact with the contact part of the block is smaller than 90°. Therefore, upward bending moment for bending the tip of the upper beam part upward is applied to the upper beam part due to a component force of the reaction force from the groove face. This upward bending moment causes tensile stress at the base of the upper beam part. As a result, not only the tensile stress derived from the shearing force but also the tensile stress derived from the upward bending moment are applied to the base of the upper beam part, resulting in synergistically increasing the tensile stress. The thus increased tensile stress causes fatigue failure at the base of the upper beam part.

In contrast, the beam angle between the vertical center line of the upper beam part of the reinforcing member and the groove face of the pulley in a position closer to the center of the pulley than a portion thereof in contact with the upper contact part of the block is 90° or more in this invention. When the beam angle is 90°, the upward bending moment is not caused. Alternatively, when the beam angle is larger than 90°, downward bending moment for reversely bending the tip of the upper beam part downward is caused due to a component force of the reaction force from the groove face of the pulley, so as to cause compressive stress at the base of the upper beam part. Accordingly, the tensile stress derived from the shearing force or tensile stress reduced correspondingly to the compressive stress derived from the downward bending moment is applied to the base of the upper beam part. As a result, large tensile stress can be suppressed from being applied to the base of the upper beam part, so as to prevent the fatigue failure due to the tensile stress from occurring at the base of the upper beam. In this manner, the transmission load of the belt can be further increased without increasing the weight of each block.

In a similar heavy-duty power transmission V-belt, the upper beam of the reinforcing member of each block can be bent between a base side portion thereof and a tip side portion thereof in a manner that a beam angle between a vertical center line of the base side portion and a pulley groove face closer to a center of a pulley than a portion of the pulley in contact with the upper contact part on the side face of the block is 90° or more, and that a beam angle between a vertical center line of the tip side portion and a pulley groove face closer to the center of the pulley than a portion of the pulley in contact with the upper contact part on the side face of the block is smaller than 90°.

In this manner, since the beam angle between the vertical center line of the tip side portion of the upper beam part of the reinforcing member and the groove face of the pulley in a position closer to the center of the pulley than a portion thereof in contact with the upper contact part of the block is smaller than 90°, the height of the block can be reduced. Specifically, as described above, when the beam angle of the entire upper beam part is 90° or more, the height of the block is increased in order to secure a fitting groove formed on the side face of the block. However, since the beam angle between the vertical center line of the base side portion alone of the upper beam part and the groove face of the pulley in a position closer to the center of the pulley than a portion thereof in contact with the upper contact part of the block is 90° or more, the height of the block can be reduced. Accordingly, each block can be decreased in its size and weight, so as to reduce vibration of the block and centrifugal tension of the belt during the drive of the belt. As a result, early breakage of the tension member due to heat generation and abrasion can be prevented, thereby increasing the life of the belt.

Furthermore, tensile stress is applied to a lower portion of an inflection portion corresponding to the bending portion of the upper beam part (namely, a boundary between the base side portion and the tip side portion), and hence, the stress applied to the base of the upper beam part can be dispersed.

In any of the aforementioned present belts, when the vertical center line of the upper beam part is a curve, an angle between a tangent line of each portion of the curved center line and the groove face is dealt with as the beam angle.

Furthermore, a vertical center line of the lower beam part of the reinforcing member can be located in a lower position at a tip thereof than at a base thereof. In this manner, similarly to the aforementioned belts, the tensile stress applied to the base of the lower beam part of the reinforcing member can be reduced, so as to prevent the fatigue failure of the base of the lower beam part. Accordingly, the transmission load of the belt can be further increased without increasing the weight of each block.

DETAILED DESCRIPTION OF THE INVENTION

Embodiment 1

Figure 1:
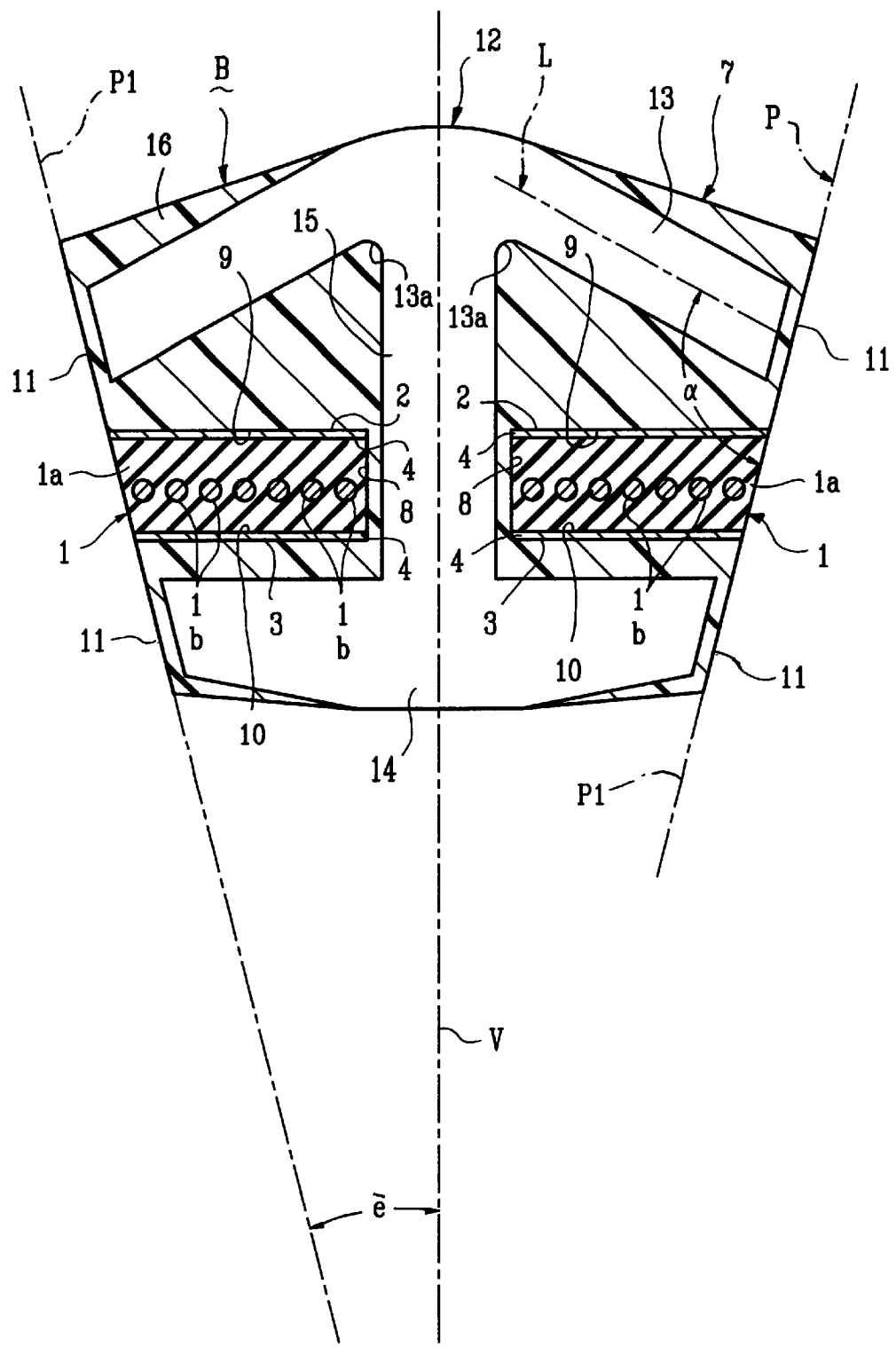
FIG. 1 is an enlarged sectional view of a heavy-duty power transmission V-belt according to Embodiment 1 of the invention.
Figure 2:
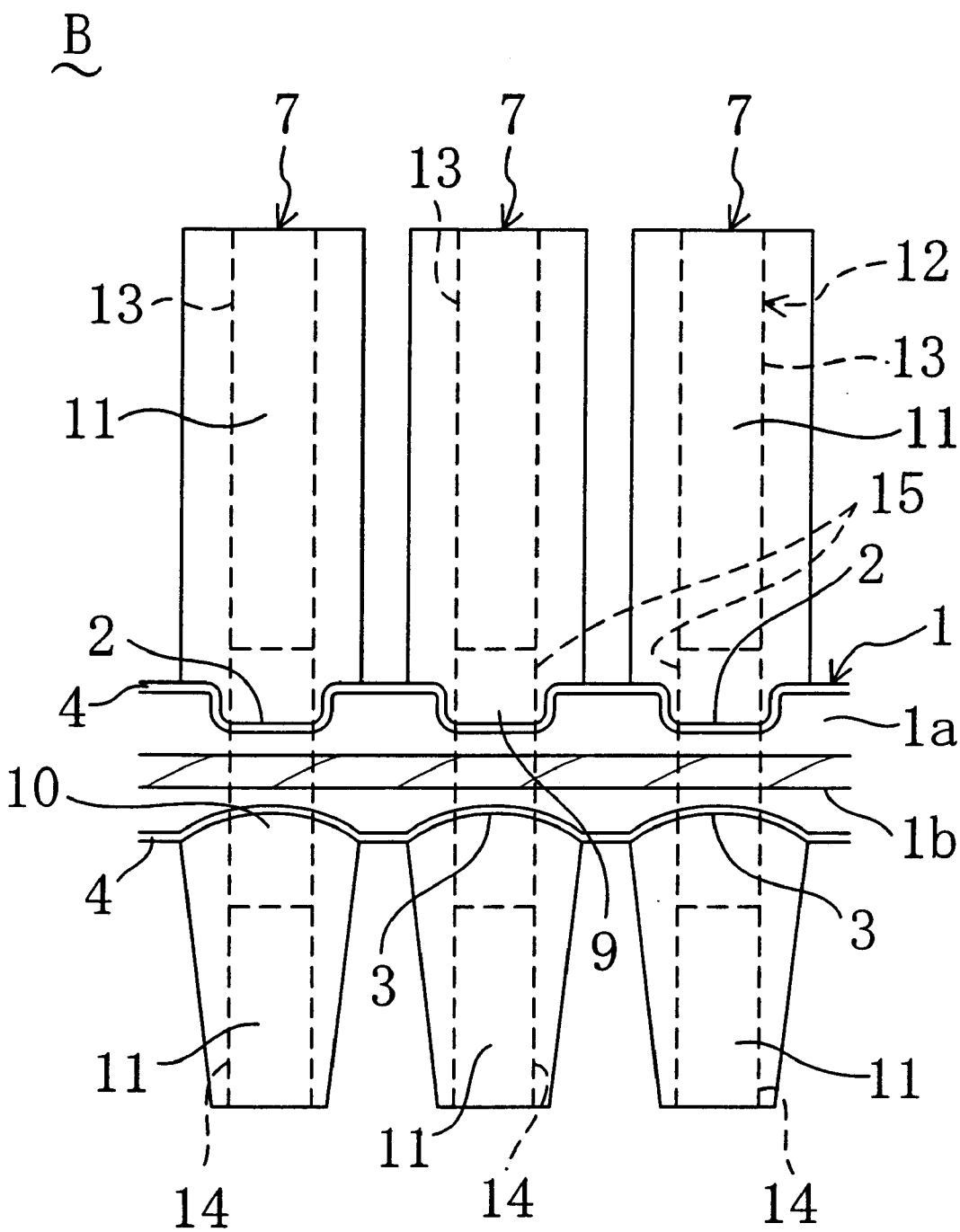
FIG. 2 is an enlarged side view of the heavy-duty power transmission V-belt of Embodiment 1.
Figure 3:
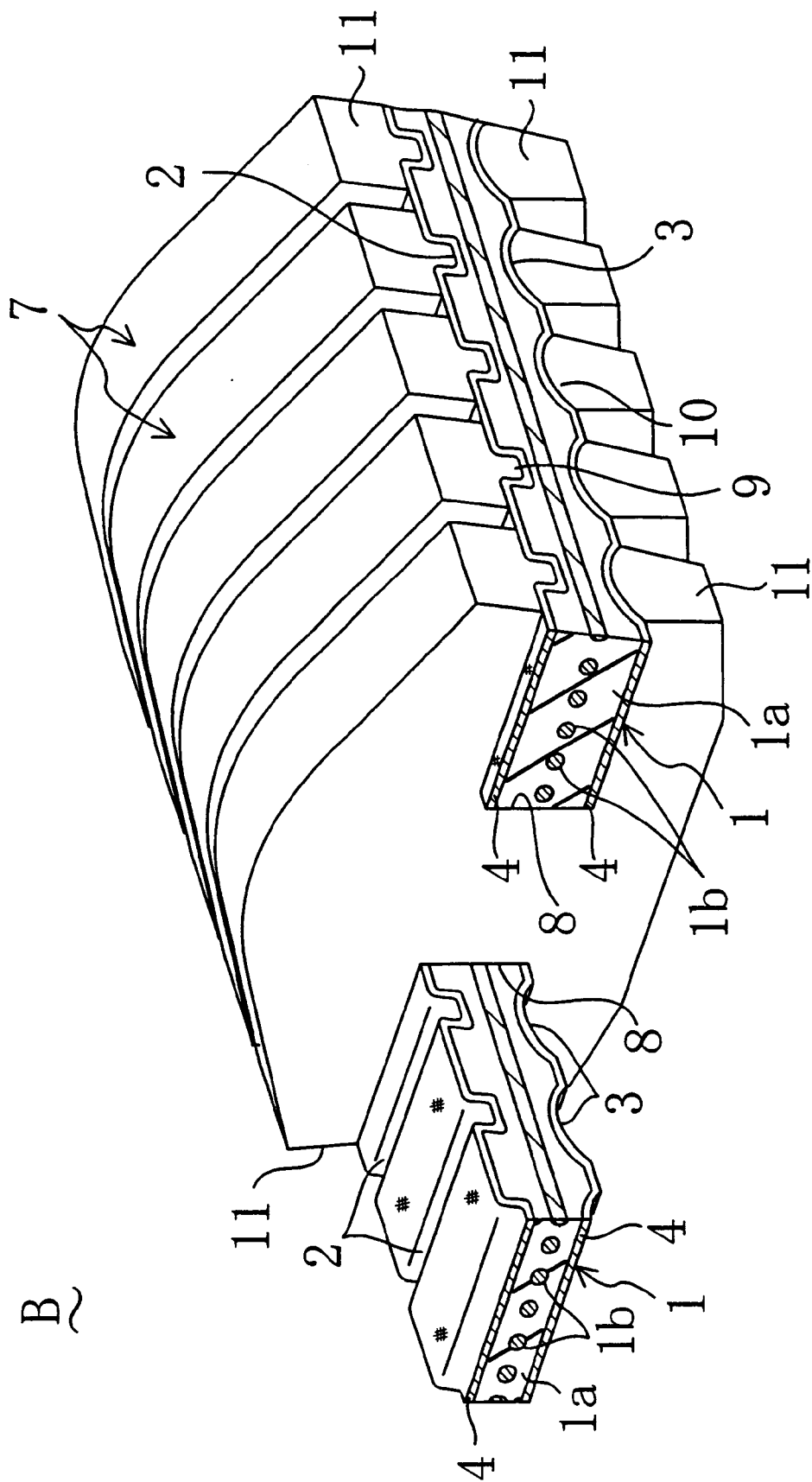
FIG. 3 is a perspective view of the heavy-duty power transmission V-belt of Embodiment 1.

FIGS. 1 through 3 show a heavy-duty power transmission V-belt B according to Embodiment 1 of the invention. The belt B includes a pair of right and left endless tension members 1 and a large number of blocks 7 fixedly and continuously engaged with the tension members 1 in a lengthwise direction of the belt. Each tension member 1 includes a form holding layer 1a of hard rubber and plural tension cords 1b of aramid fiber or the like having high strength and a high elastic modulus and spirally arranged and embedded in the form holding layer 1a. On the upper face of each tension member 1, upper concave parts 2 each in the shape of a groove serving as upper engaged parts are formed to be arranged at a given pitch correspondingly to the respective blocks 7 and to extend in a widthwise direction of the belt, and on the lower face of the tension member 1, lower concave parts 3 serving as lower engaged parts are formed to be arranged at a given pitch correspondingly to the respective upper concave parts 2 and to extend in the widthwise direction of the belt. Onto the upper and lower faces of each tension member 1, belt fabrics 4 are adhered for the purpose of improving the abrasion resistance.

As the hard rubber used for the form holding layer 1a, for example, H-NBR rubber reinforced by zinc methacrylate is further reinforced by single fiber such as aramid fiber and nylon fiber, so as to obtain hard rubber that is excellent in heat resistance and is permanently difficult to deform. The hardness of the hard rubber is required to be 75° or more when measured with a JIS-C hardness meter.

On the other hand, each block 7 includes a fitting groove 8 in the shape of a notch groove on each side face in the widthwise direction of the belt for removably fitting each tension member 1 in the widthwise direction. The side face of the block 7 above and below the fitting groove 8 is made into upper and lower contact parts 11 to be in contact with a groove face P1 of a pulley P. By fitting the tension members 1 in the fitting grooves 8 of the respective blocks 7, the blocks 7 are continuously fixed on the tension members 1 in the lengthwise direction of the belt.

Specifically, an upper convex part 9 serving as an upper engaging part to be engaged with each upper concave part 2 on the upper face of the tension member 1 is formed on the upper face of each fitting groove 8 of each block 7, and a lower convex part 10 serving as a lower engaging part to be engaged with each lower concave part 3 on the lower face of the tension member 1 is formed on the lower face of each fitting groove 8 so as to be in parallel with the upper convex part 9. By engaging the upper and lower convex parts 9 and 10 of each block 7 with the upper and lower concave parts 2 and 3 of each tension member 1, the blocks 7 are fixedly engaged with the tension members 1 in the lengthwise direction of the belt. In this engagement state, the contact parts 11 corresponding to the left and right side faces of the respective blocks 7 are in contact with the groove face P1 of the pulley P (whereas the outer side faces of the respective tension members 1 can be also allowed to be in contact with the pulley face P1).

As is shown in FIGS. 1 and 2, each block 7 includes a resin part 16 of a hard resin material. Within the resin part 16, a reinforcing member 12 of a light-weight aluminum alloy or the like is embedded so as to be positioned at substantially the center of the block 7. The reinforcing member 12 is embedded in the hard resin material and not exposed on the surface of the block 7 in, for example, the upper and lower convex parts 9 and 10 (the parts to be engaged with the tension member 1) and the contact parts 11 on the right and left side faces (namely, the convex parts and the contact parts are made from the hard resin material). In the other parts, the reinforcing member 12 can be exposed on the surface of the block 7. The reinforcing member 12 is formed substantially in the shape of H and includes a pair of right and left upper beam parts 13 and a pair of right and left lower beam parts 14 extending in the widthwise direction (rightward and leftward) and a pillar part 15 for connecting the bases of the right and left upper beam parts 13 with the bases of the right and left lower beam parts 14.

Furthermore, as is shown in FIG. 1, each of the upper beam parts 13 of the reinforcing member 12 is in the shape of a substantially straight plate, and is inclined from the base (namely, a portion connected with the upper end of the pillar part 15) downward to the tip thereof. Thus, the right and left upper beam parts 13 as a whole have a substantially doglegged shape with the center thereof located at a higher level than the right and left ends thereof. Moreover, a beam angle α between a vertical center line L of the upper beam part 13 and the groove face P1 of the pulley P in a position closer to the center of the pulley P than a portion thereof in contact with the contact part 11 is 90 degrees or more ($\alpha \geq 90°$).

In this embodiment, in the reinforcing member embedded in each block 7 of the belt B, the upper beam parts 13 are inclined from the bases thereof (the portions connected with the upper end of the pillar part 15) downward to the tips thereof. In addition, the beam angle α between the vertical center line L of each upper beam part 13 and the groove face P1 in a position closer to the center of the pulley P than a portion thereof in contact with the contact part 11 is 90° or more. Accordingly, in a power transmission state where the belt B is wound around the pulley P, when the block 7 receives a pushing force from the tension member 1 toward the groove face P1 of the pulley P and the upper contact part 11 of the block 7 receives a reaction force from the groove face P1 in a perpendicular direction to the groove face, the following effects can be obtained.

When the beam angle α is 90°, upward bending moment for pushing and bending the tip of the upper beam part 13 upward by the reaction force from the groove face P1 is not caused. Therefore, to the base 13a of the upper beam part 13 is applied merely tensile stress derived from a shearing force in the lengthwise direction of the belt working between each block 7 and the tension member 1 in the power transmission state between the belt B and the pulley P.

On the other hand, when the beam angle α is larger than 90°, downward bending moment for pushing and bending the tip of the upper beam part 13 downward is caused by a downward component force of the reaction force from the groove face P1. This downward bending moment causes compressive stress at the base 13a of the upper beam part 13. Therefore, to the base 13a of the upper beam part 13, not only the tensile stress derived from the shearing force in the lengthwise direction but also the compressive stress in the reverse direction derived from the downward bending moment are applied. Therefore, the stress is canceled, resulting in reducing the tensile stress derived from the shearing force.

As a result, large tensile stress can be prevented from being applied to the base 13a of the upper beam part 13, so as to prevent fatigue failure due to the tensile stress of the base 13a of the upper beam part 13. Thus, the transmission load of the belt B can be increased without increasing the weight of each block 7.

Embodiment 2

Figure 4:
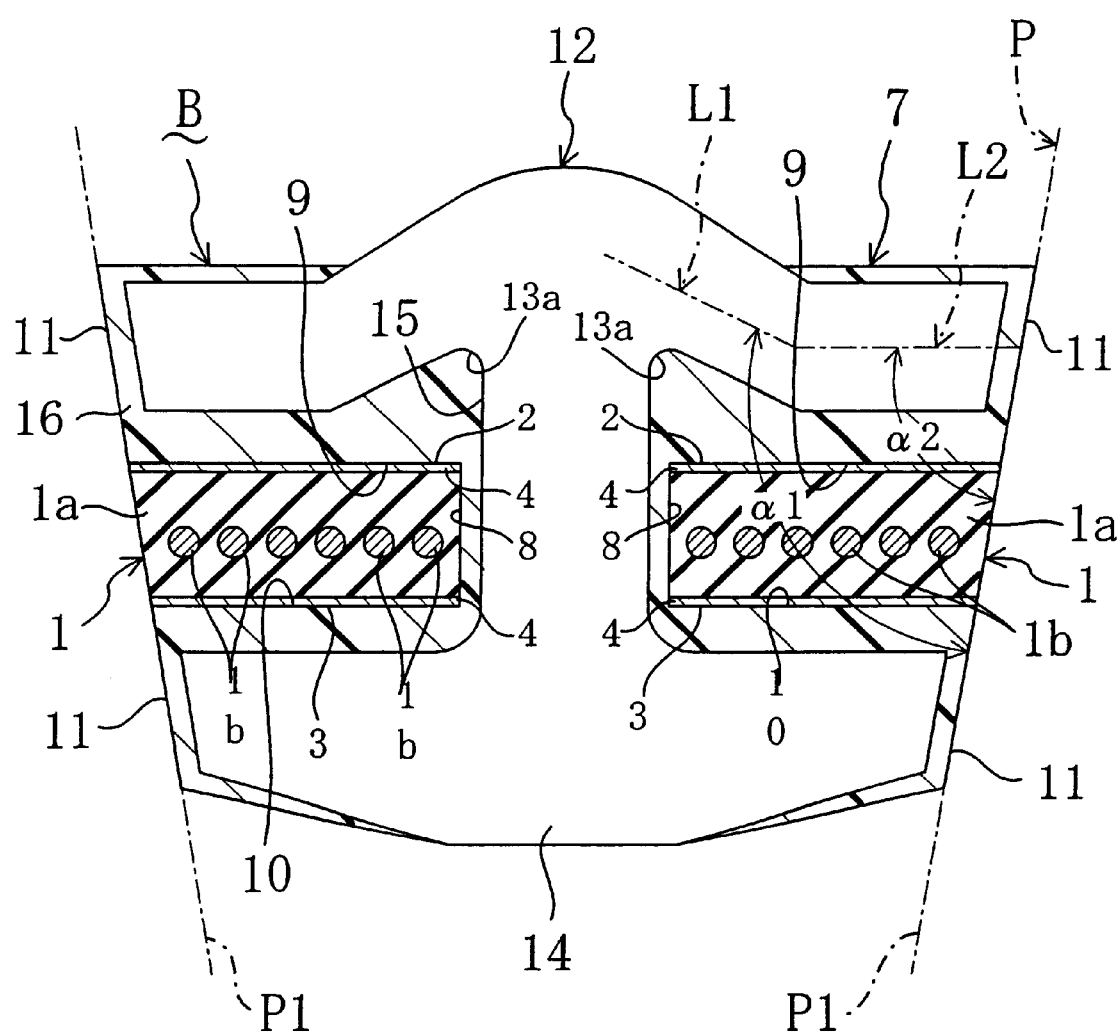
FIG. 4 is an enlarged sectional view, similar to FIG. 1, of a heavy-duty power transmission V-belt according to Embodiment 2 of the invention.
Figure 5:
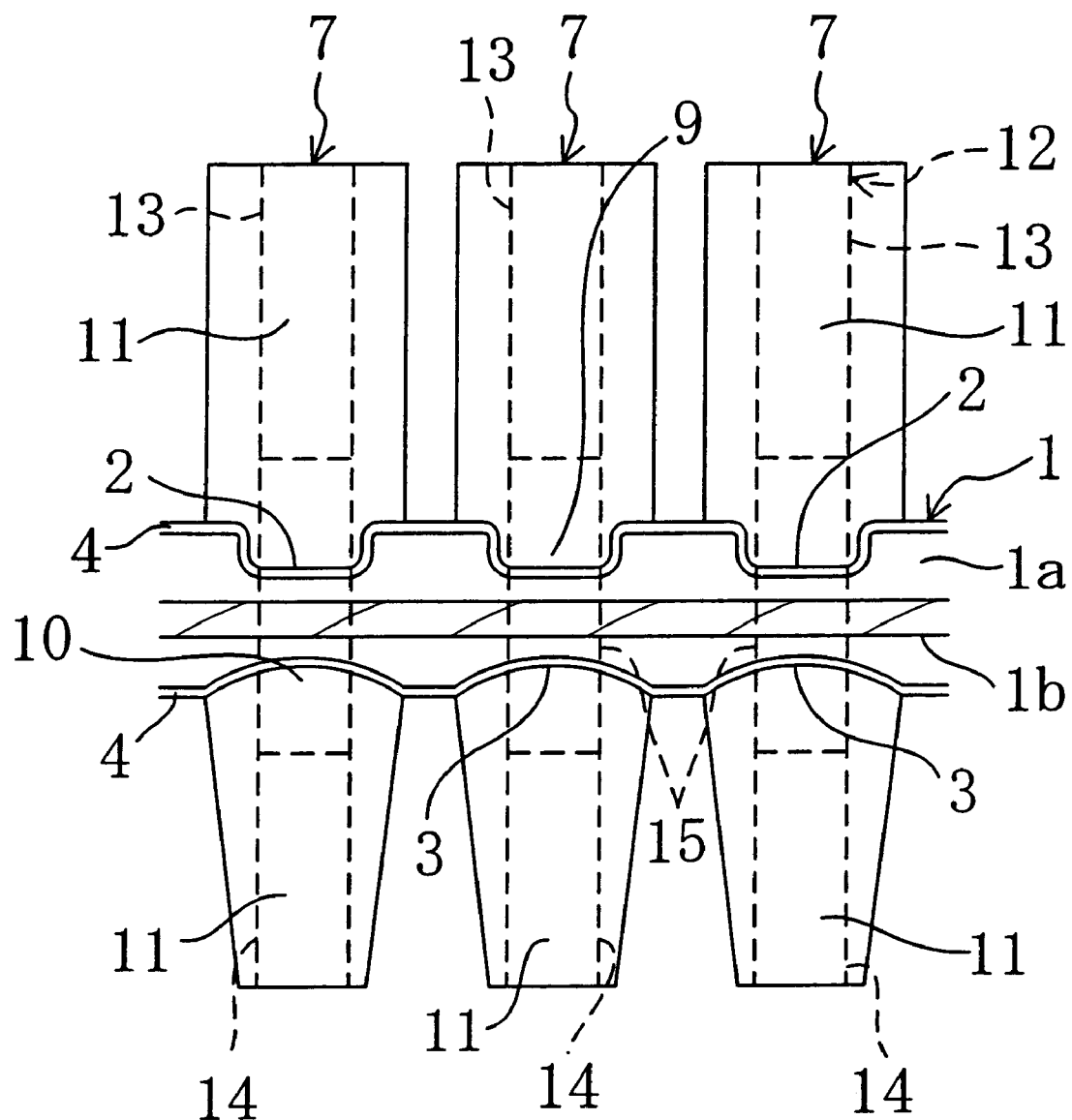
FIG. 5 is an enlarged side view, similar to FIG. 2, of the heavy-duty power transmission V-belt of Embodiment 2.

FIGS. 4 and 5 show a heavy-duty power transmission V-belt according to Embodiment 2, in which each upper beam part 13 has a different shape. In this and other embodiments described below, like reference numerals are used to refer to like elements shown in FIGS. 1 through 3 and description is omitted.

In this embodiment, each of the upper beam parts 13 of a reinforcing member 12 embedded in each block 7 is bent. In the upper beam part 13, a base side portion from the base thereof to the center thereof is inclined downward toward the tip thereof and a tip side portion from the center thereof to the tip thereof extends in a substantially horizontal direction. Therefore, the right and left upper beam parts 13 as a whole have an angular shape with merely the center of them locally projecting from the right and left ends thereof.

In each upper beam 13, a beam angle α1 between a vertical center line L1 of the base side portion extending from the base to the center and a groove face P1 of a pulley in a position closer to the center of the pulley than a portion thereof in contact with an upper contact part 11 of the block 7 is 90° or more ($\alpha 1 \geq 90°$) similarly to Embodiment 1. On the contrary, a beam angle α2 between a vertical center line L2 of the tip side portion extending from the center to the tip and the groove face P1 in a position closer to the center of the pulley than a portion thereof in contact with the upper contact part 11 is smaller than 90° ($\alpha 2 < 90$).

In embodiment 2, since the beam angle α2 between the vertical center line L2 of the tip side portion of the upper beam part 13 of the reinforcing member 12 and the groove face P1 in a position closer to the center of the pulley than a portion thereof in contact with the upper contact part 11 is thus smaller than 90°, the height of the block 7 can be decreased. Specifically, when the beam angle α is 90° or more in the entire upper beam parts 13 as in Embodiment 1, the height of the block 7 should be large in order to secure the fitting grooves 8 on the side faces of the block 7. In contrast, since the beam angle α1 between the vertical center line L1 of the base side portion alone and the groove face P1 in a position closer to the center of the pulley than the portion thereof in contact with the upper contact part 11 of the block 7 is 90°0 or more in Embodiment 2, the height of the block 7 can be decreased correspondingly to a portion where the beam angle is thus locally restricted. Accordingly, the block 7 can be decreased in its size and weight, so as to reduce vibration of the blocks 7 and centrifugal tension of the belt B during the drive and prevent early breakage of the tension members 1 due to heat generation and abrasion. As a result, the life of the belt B can be increased. In this manner, the life of the belt and the transmission load can be both increased.

Also in this embodiment, tensile stress is applied to a lower portion of an inflectional portion corresponding to the bending portion of the upper beam part 13 (i.e., the boundary between the base side portion and the tip side portion). Therefore, the stress applied to the base 13a of the upper beam part 13 can be dispersed, so as to effectively prevent the fatigue failure of the base 13a.

Embodiment 3

Figure 6:
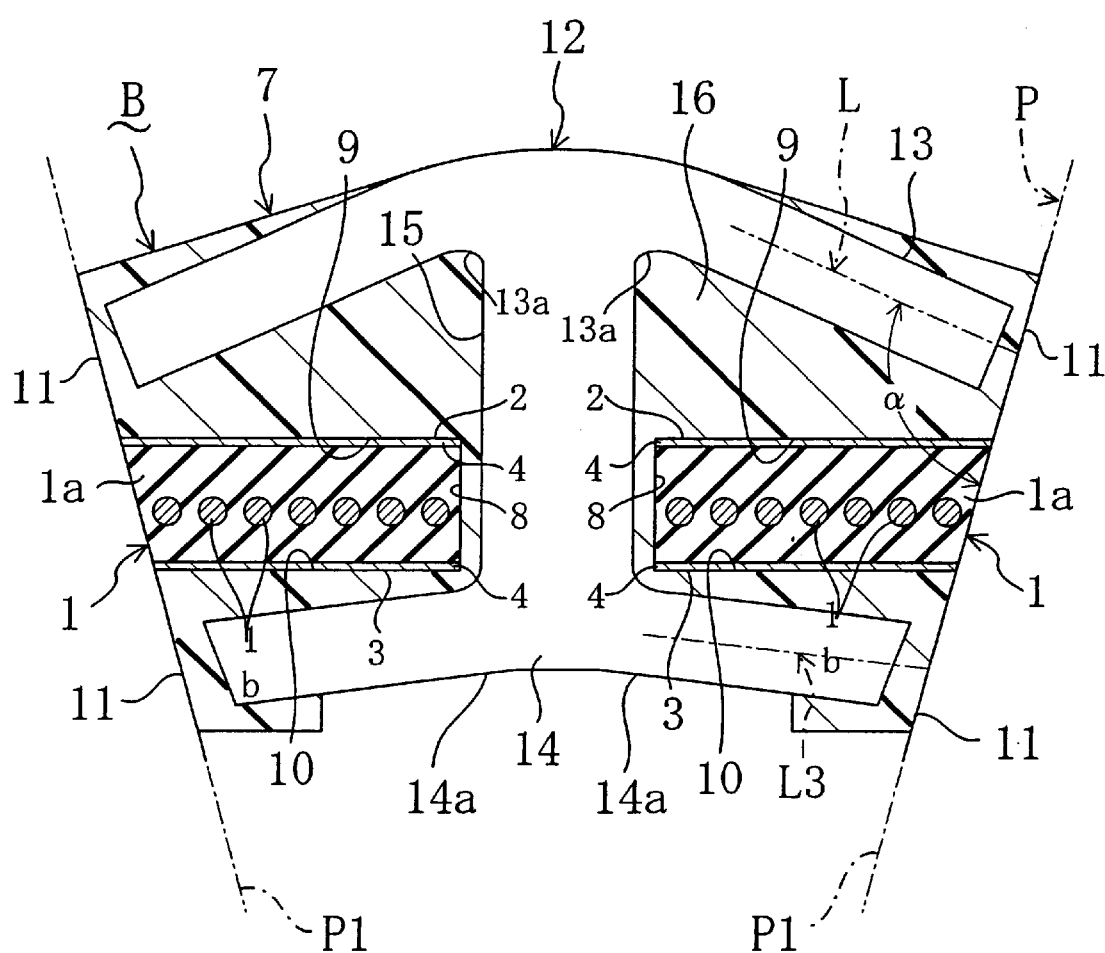
FIG. 6 is an enlarged sectional view, similar to FIG. 1, of a heavy-duty power transmission V-belt according to Embodiment 3 of the invention.

FIG. 6 shows a heavy-duty power transmission V-belt according to Embodiment 3, in which upper beam parts 13 of a reinforcing member 12 within each block 7 are inclined so that a beam angle α against a groove face PI of a pulley can be 90° or more similarly to Embodiment 1. In addition, lower beam parts 14 of the reinforcing member 12 are also inclined, so that a vertical center line L3 of each lower beam part 14 can be located in a lower position at its tip than at its base.

In this embodiment, large tensile stress applied to a base 13a of the upper beam part 13 of the reinforcing member 12 can be suppressed so as to prevent the fatigue failure of the base 13a as in Embodiment 1. In addition, tensile stress applied to a base 14a of the lower beam part 14 can be similarly reduced, so as to prevent the fatigue failure of the base 14a of the lower beam part 14. As a result, the transmission load of the belt B can be further increased.

Embodiment 4

Figure 7:
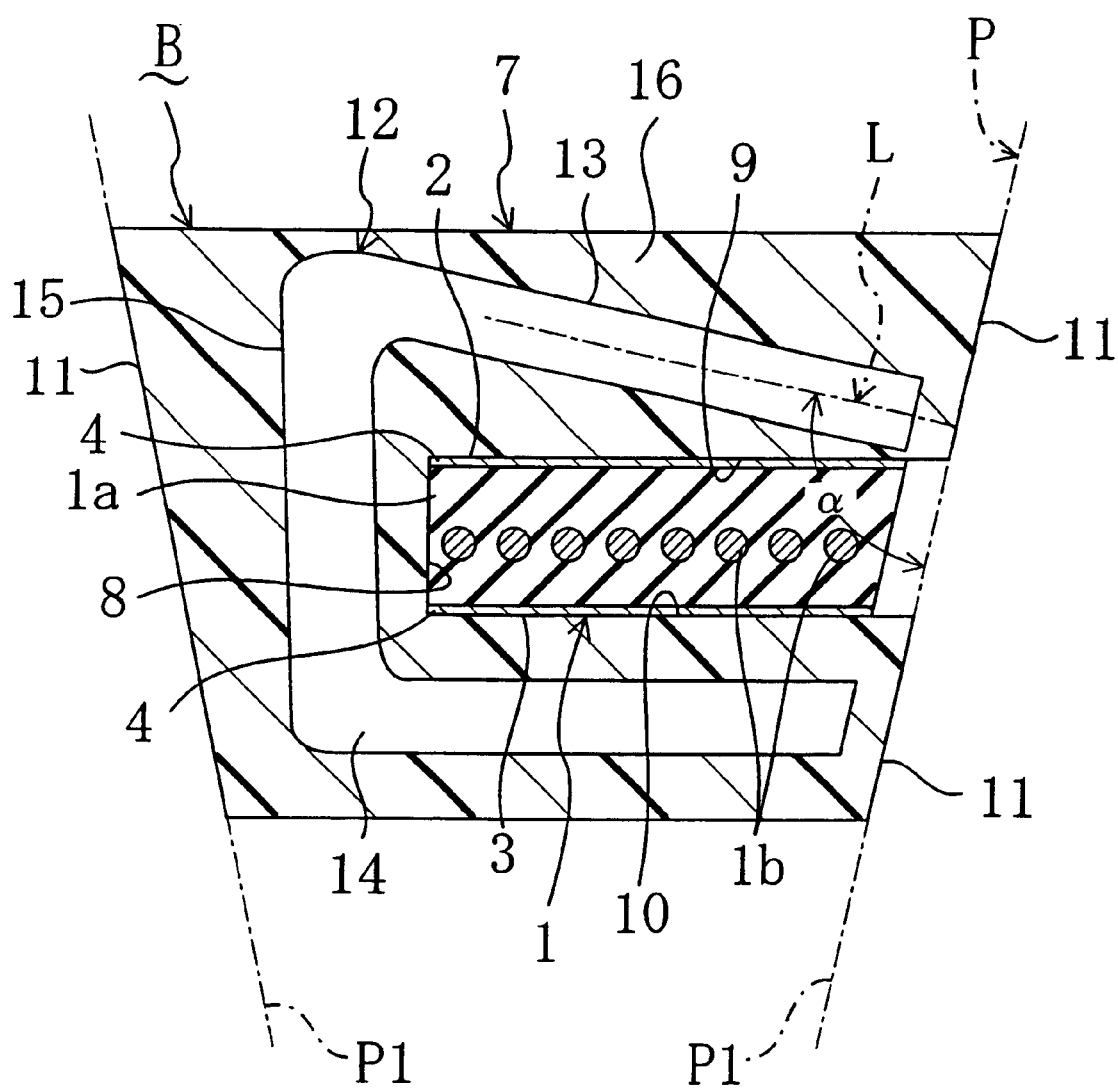
FIG. 7 is an enlarged sectional view, similar to FIG. 1, of a heavy-duty power transmission V-belt according to Embodiment 4 of the invention.

FIG. 7 shows a heavy-duty power transmission V-belt according to Embodiment 4. In Embodiments 1 through 3, the reinforcing member 12 substantially in an H-shape is embedded in each block 7. In contrast, a reinforcing member 12 of this embodiment is in substantially a U-shape including one upper beam part 13, one lower beam part 14 and a pillar part 15 for connecting the bases of the beam parts 13 and 14. Furthermore, a fitting groove 8 is formed in merely one side face of each block 7, and one tension member 1 is fit in the fitting groove 8 so as to be positioned substantially at the center in the widthwise direction of the belt (substantially at the horizontal center of the block 7). No fitting groove is formed in the other side face of the block 7, and the entire of this side face is formed into a contact part 11 to be brought into contact with a groove face P1 of a pulley.

A beam angle α of the upper beam part 13 of the reinforcing member 12 (i.e., an angle between a vertical center line L of the upper beam part 13 and the groove face P1 in a position closer to the center of the pulley than a portion thereof in contact with the upper contact part 11 of the block 7) is 90° or more. Accordingly, this embodiment can attain the same effects as those of Embodiment 1.

Figure 8:
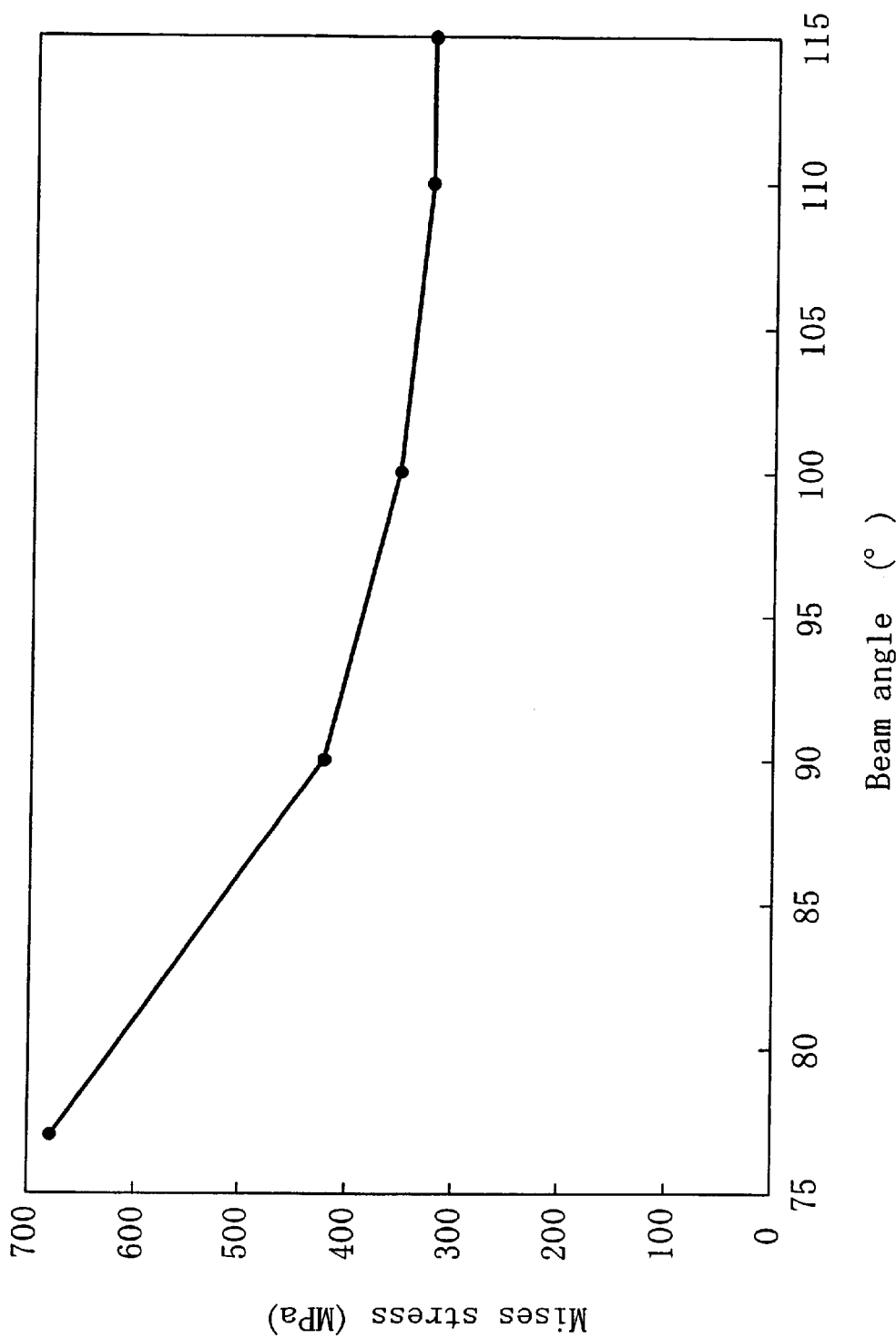
FIG. 8 is a characteristic diagram for showing change of Mises stress against a beam angle.
Figure 9:
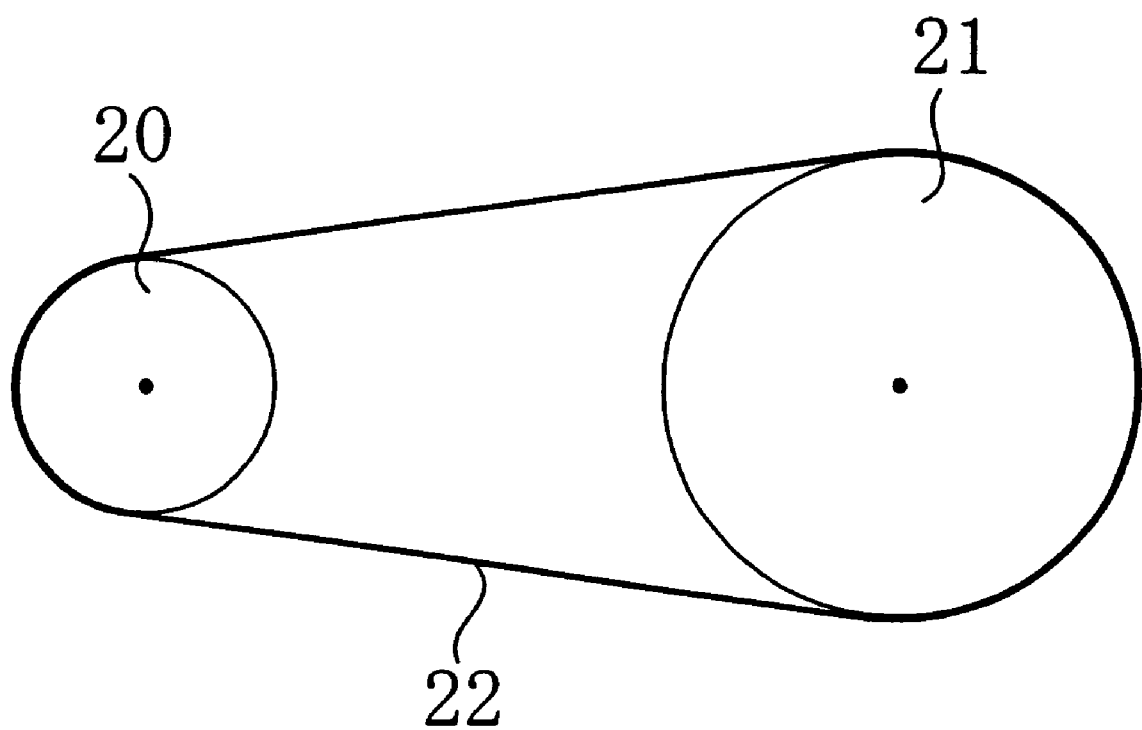
FIG. 9 is a schematic diagram for showing conditions of a drive durability test for a belt.

In any of the aforementioned embodiments, the beam angle α or α1 is specified as 90° or more, and the upper limit of the beam angle α is preferably 110° through 115° for the following reason: The present inventors have examined change of Mises stress (stress applied to the reinforcing member) in accordance with change of the beam angle α in the structure where the upper beam parts 13 are bent as in Embodiment 2. As a result, it has been found that Mises stress is not largely lowered when the beam angle is 110° or more as is shown in FIG. 8. Accordingly, it is preferred that the upper limit of the beam angle α is 110° through 115°.

Also, in the aforementioned embodiments, each upper beam part 13 of the reinforcing member 12 has a linear shape or a bent shape including a combination of linear shapes, but the upper beam part 13 can be curved. In this case, an angle between a tangent line of each portion of a vertical center line and the groove face P1 of the pulley is dealt with as the beam angle α, which should be 90° or more.

Furthermore, in any of the aforementioned embodiments, the upper concave parts 2 and the lower concave parts 3 are respectively formed on the upper and lower faces of the tension member 1 and the upper convex parts 9 and the lower convex parts 10 are formed on the blocks 7. However, the relationship between the concave and convex parts can be appropriately changed between the tension member 1 and the blocks 7. For example, convex parts serving as the engaged parts can be formed on the upper and lower faces of the tension member 1 with the concave parts serving as the engaging parts formed on the blocks 7.

Moreover, a friction coefficient μ between each contact part 11 on the right or left side face of the block 7 and the groove face P1 of the pulley can be determined with respect to a belt side face angle è between the side face of the belt B and a vertical plane (a plane passing through the center in the widthwise direction of the belt B), so as to have a relationship of $\mu \leq \tan\grave{e}+0.05$. In this manner, the friction coefficient μ can be lowered in accordance with the belt side face angle è, so that the blocks 7 can be prevented from biting into the pulley groove even when the belt B is wound around the pulley P and the resin parts 16 of the blocks 7 are compressed by the contact parts 11 by a pushing force and a shearing force from the tension members 1. Therefore, when the blocks 7 are taken out from the pulley groove thereafter, the blocks 7 are not jammed in the pulley groove but can be smoothly taken out of the pulley groove without pulling the tension members 1. Accordingly, the fatigue failure of the tension members 1 can be suppressed so as to prevent early breakage thereof. In other words, while increasing the transmission load of the belt B, the early breakage of the tension member 1 can be prevented by allowing the blocks 7 to be smoothly taken out of the pulley groove, resulting in increasing the life of the belt B.

Next, specific examples will be described. A block belt including a reinforcing member with the structure of Embodiment 2 in which the beam angle of a base side portion of an upper beam part is set to 110° (with a tip side portion thereof extending in the horizontal direction) is fabricated. The block belt is subjected to a drive durability test as follows:

The block belt 22 is wound around a driving pulley 20 with a pulley diameter of 64.94 mm and a driven pulley 21 with a pulley diameter of 162.36 mm. The driving pulley 20 is driven at a rotating speed of 2600 rpm with rotation torque of 84 N·m at a temperature of 90° C. As a result, the base of the upper beam part is not broken during the drive of 200 hours or more.

In contrast, a block belt with a conventional structure in which the beam angle is set to 77° (fabricated as a conventional example) is subjected to the same test, and the upper beam part is broken within 24 hours. This result reveals that when the beam angle of the upper beam part is 90° or more as in this invention, the breakage of the upper beam part can be prevented, resulting in increasing the life of the belt.

What is claimed is:

1. A heavy-duty power transmission V-belt comprising:

two tension members each including a large number of upper engaged parts and lower engaged parts respectively correspondingly formed on upper and lower faces thereof and arranged in a lengthwise direction of said belt; and a large number of blocks each including a fitting groove on each side face thereof in a widthwise direction of said belt and upper and lower contact parts formed on upper and lower sides of said fitting groove to be brought into contact with a pulley groove face, said fitting groove including an upper engaging part formed on an upper face thereof to be engaged with each of said upper engaged parts of said tension members and a lower engaging part formed on a lower face thereof to be engaged with each of said lower engaged parts of said tension members, wherein said blocks are fixedly engaged with said tension members by fitting said tension members in said fitting grooves of said blocks, each of said blocks includes a reinforcing member embedded in a resin part such that at least said upper and lower engaging parts and said contact parts are made from said resin part, said reinforcing member includes upper and lower beam parts located above and below said fitting groove and a pillar part having an axis for connecting bases of said upper and lower beam parts wherein end portions of said upper beam part are entirely embedded in said resin part, wherein a beam angle between a center line of said upper beam part of said reinforcing member and a pulley groove face closer to a center of a pulley than a portion of the pulley in contact with said upper contact part on the side face of said block is 90° or more, and wherein an angle between said center line of said upper beam part and said axis of said pillar part is acute.

2. The heavy-duty power transmission V-belt of claim 1, wherein a center line of said lower beam part of said reinforcing member is located in a lower position at a tip thereof than at a base thereof.

3. A heavy-duty power transmission V-belt comprising:

a tension member including a large number of upper engaged parts and lower engaged parts respectively correspondingly formed on upper and lower faces thereof and arranged in a lengthwise direction of said belt; and a large number of blocks each including a fitting groove on a side face thereof in a widthwise direction of said belt and upper and lower contact parts formed on upper and lower sides of said fitting groove to be brought into contact with a pulley groove face, said fitting groove including an upper engaging part formed on an upper face thereof to be engaged with each of said upper engaged parts of said tension member and a lower engaging part formed on a lower face thereof to be engaged with each of said lower engaged parts of said tension member, wherein said blocks are fixedly engaged with said tension member by fitting said tension member in said fitting grooves of said blocks, each of said blocks includes a reinforcing member embedded in a resin part such that at least said upper and lower engaging parts and said contact parts are made from said resin part, said reinforcing member includes upper and lower beam parts located above and below said fitting groove and a pillar part for connecting bases of said upper and lower beam parts, said upper beam part of said reinforcing member includes end portions that are entirely embedded in said resin part and is bent between a pillar side portion thereof and a portion opposite to said pillar side portion thereof such that a beam part angle between a center line of said pillar side portion and a pulley groove face closer to a center of a pulley than a portion of the pulley in contact with said upper contact part on the side face of said block is 90° or more, and that a beam angle between a center line of said pillar side portion and a pulley groove face closer to the center of the pulley than a portion of the pulley in contact with said upper contact part on the side face of said block is smaller than 90°.

4. The heavy-duty power transmission V-belt of claim 3, wherein a center line of said lower beam part of said reinforcing member is located in a lower position at a tip thereof than at a base thereof.

* * * * *